United States Patent
Yoo et al.

(10) Patent No.: US 6,553,086 B1
(45) Date of Patent: Apr. 22, 2003

(54) METHOD AND APPARATUS FOR RECORDING TIME INFORMATION FOR DIGITAL DATA STREAMS

(75) Inventors: Jea-Yong Yoo, Seoul (KR); Byung-Jin Kim, Kyunggi-do (KR); Kang-Soo Seo, Kyunggi-do (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/410,755

(22) Filed: Oct. 1, 1999

(30) Foreign Application Priority Data

Oct. 2, 1998 (KR) .............................. 98-41937
Feb. 9, 1999 (KR) .............................. 99-4467

(51) Int. Cl.$^7$ .............................. H04N 5/91; H04N 5/95
(52) U.S. Cl. .............................. 375/354; 386/83
(58) Field of Search .................. 360/60–100; 375/240, 375/354; 386/1–126; 709/231

(56) References Cited

U.S. PATENT DOCUMENTS

| | | | | |
|---|---|---|---|---|
| 4,011,517 A | * | 3/1977 | Pommerening et al. ..... | 327/114 |
| 5,619,337 A | * | 4/1997 | Naimpally .................... | 360/18 |
| 6,169,843 B1 | * | 1/2001 | Lenihan et al. ............. | 370/394 |
| 6,408,338 B1 | * | 6/2002 | Moon et al. ................. | 386/109 |
| 6,445,877 B1 | * | 9/2002 | Okada et al. ............... | 386/125 |
| 6,453,116 B1 | * | 9/2002 | Ando et al. ................. | 386/125 |

\* cited by examiner

Primary Examiner—Stephen Chin
Assistant Examiner—Lawrence Williams
(74) Attorney, Agent, or Firm—Birch, Stewart, Kolasch & Birch, LLP

(57) ABSTRACT

A method and apparatus for recording time information for digital data streams. When a received digital data stream is recorded on a recording medium such as a digital video disk, time information for searching the digital data stream is added to the digital data stream, the format of the time information being compatible with the time format of the navigation data. The time information for the recorded digital data stream can be effectively used when searching a digital data stream corresponding to a search time requested by a user, thereby enabling fast and precise search operations with no additional information.

16 Claims, 8 Drawing Sheets

Conventional Art

FIG. 4

| Stream OBject Information (SOBI) | Stream OBject General Information (SOB_GI) | |
|---|---|---|
| | Mapping List (MAPL) | Incremental APAT # 1 (IAPAT #1) |
| | | ⋮ |
| | | Incremental APAT # N (IAPAT #N) |

*Conventional Art*

FIG. 5

| SOB_GI | | |
|---|---|---|
| SOBU_SZ | Minium Mapping Unit Size | 2 Bytes |
| MTU_SHFT | Mapping Time Unit Shift | 1 Bytes |
| Reserved | Reserved | 1 Byte |
| MAPL_ENT_Ns | Number of Mapping List Entries | 4 Bytes |
| S_S_APAT | Stream Start APAT | 8 Bytes |
| S_E_APAT | Stream End APAT | 8 Bytes |

(a)

| Incremental APAT | | |
|---|---|---|
| IAPAT | Incremental APAT | 2 Bytes |

(b)

*Conventional Art*

FIG. 6A

| PAT_base [ 38 ~ 31 ] | |
|---|---|
| PAT_base [ 30 ~ 23 ] | |
| PAT_base [ 22 ~ 15 ] | |
| PAT_base [ 14 ~ 7 ] | |
| PAT_base [ 6 ~ 0 ] | PAT_ext [ 8 ] |
| PAT_ext [ 7 ~ 0 ] | |

PAT_base : 90 KHz unit ,  PAT_ext : 27 MHz unit ( 0 ~ 299 )

*Conventional Art*

FIG. 6B

| PAT [ 31 ~ 24 ] |
|---|
| PAT [ 23 ~ 16 ] |
| PAT [ 15 ~ 8 ] |
| PAT [ 7 ~ 0 ] |

PAT : 27 MHz unit

*Conventional Art*

PAT_base : 90 KHz unit ,   PAT_ext : 27 MHz unit ( 0 ~ 299 )

PAT_base : 90 KHz unit ,   PAT_ext : 27 MHz unit ( 0 ~ 299 )

METHOD AND APPARATUS FOR RECORDING TIME INFORMATION FOR DIGITAL DATA STREAMS

BACKGROUND OF THE INVENTION

1. Field of the Invention

The present invention relates to a method and apparatus for recording and transferring time information for digital data streams. A digital data stream is recorded on a recording medium along with the time information thereof and thus every packet stream unit has the time information of its own. The time information is used for searching the recording medium for a specific packet stream unit requested by a user and maintaining a precise timing for transferring packet stream units through a digital interface to an external apparatus.

2. Description of the Related Art

In conventional analog television broadcast, video signals are transmitted over the air or through cables after being AM or FM modulated. With the recent rapid advance of digital technologies such as digital image compression or digital modulation/demodulation, standardization for digital television broadcast is in rapid progress. Based upon the Moving Picture Experts Group (MPEG) format, satellite and cable broadcast industry also moves towards digital broadcast.

Digital broadcast offers several advantages that its analog counterpart cannot provide. For example, digital broadcast is capable of providing services with far more improved video/audio quality, transmitting several different programs within a fixed bandwidth, and offering enhanced compatibility with digital communication media or digital storage media.

In digital broadcast, a plurality of programs encoded based upon the MPEG format are multiplexed into a transport stream before transmitted. The transmitted transport stream is received by a set top box at the receiver and demultiplexed into a plurality of programs. If a program is chosen from among the demultiplexed programs, the chosen program is decoded by a decoder in the set top box and original audio and video signals are retrieved. The retrieved audio and video signals can be presented by an A/V output apparatus such as a TV.

It is also possible to store the received digital broadcast signals on a storage medium instead of directly outputting the received broadcast signals to A/V output devices. The stored digital broadcast signals can be edited and presented afterwards. For example, a digital data stream received by a set top box can be stored in a streamer such as a digital video disk (DVD) through communication interfaces like an IEEE-1394 serial bus. Later, the stored digital data stream can be edited and transmitted back to the set top box so that the original digital audio and video data can be presented.

When recording the digital data stream of a single program in a streamer, the basic recording unit is the stream object (SOB) comprising a series of stream object units (SOBUs). To record received digital broadcast signals in a streamer and reproduce the recorded signals afterwards, it is necessary to explore how to group and record stream objects (SOBs) and stream object units (SOBUs) and how to create search information for managing and searching for the recorded stream objects (SOBS) and stream object units (SOBUs). Also, it is required to investigate how to search a specific data stream corresponding to a search time requested by a user.

A conventional method for recording digital data streams and creating and recording navigation information will now be explained with reference to the accompanying drawings.

FIG. 1 depicts a block diagram of an apparatus in which the conventional method for creating and recording the navigation information of a digital data stream can be employed. FIG. 2 depicts the process of recording the digital data stream and creating the navigation information in the system shown in FIG. 1. The system comprises a set top box 100, a communication interface (IEEE-1394), and a streamer 200. Set top box 100 receives transport streams encoded by system encoders and broadcast by a plurality of broadcast stations and demultiplexes the received transport streams. After a decoder 120 decodes the transport stream of a program tuned by a tuning unit 110, a control unit 140 outputs the decoded transport stream to an A/V output apparatus or to streamer 200 through an IEEE-1394 communication interface 130 and 210 so that the transmitted program can be recorded in streamer 200, depending upon a user's request. When requested by a user, streamer 200 retrieves the recorded program and transmits the retrieved program through the IEEE-1394 communication interface back to set top box 100. In set top box 100, the received program is decoded by decoder 120 and outputted to an A/V output apparatus so that the recorded program can be presented.

A control unit 250 in streamer 200 controls the data stream transmitted from set top box 100 to be recorded as shown in FIG. 2 on a recording medium 230 by a recording stream processing unit 220. The received data stream consisting of transport stream packets is recorded on the recording medium along with the packet arrival time (PAT) of each transport stream packet, wherein the packet arrival time will be used as a time reference for transmitting the associated transport packet in playback. In streamer 200, the transport stream packets with packet arrival times are organized in sectors with each sector having a predetermined size. A predetermined number of sectors, for example 32 sectors, are grouped into a stream object unit (SOBU). If the recording process is stopped or suspended by a user, the recorded stream object units (SOBUs) are organized into a stream object (SOB). Additionally, navigation data such as the stream start application packet arrival time (S_S_APAT) and incremental application packet arrival time (IAPAT) for searching for and managing the stream object (SOB) and stream object units (SOBUs) is recorded together on the recording medium.

FIG. 3 shows the way the received digital data stream is recorded in streamer 200. An application packet and a packet arrival time (PAT or time stamp) constitute a transport stream packet (TSP). A plurality of transport stream packets (TSPs) and a header are organized into a sector and a predetermined number of sectors, for example 32 sectors, constitute a stream object unit (SOBU). A series of stream object units (SOBUs) constitutes a stream object (SOB). Meanwhile, the stream object information (SOBI), which is the navigation data for managing and searching for the recorded stream objects (SOBs), comprises a stream object general information (SOB_GI) and a mapping list (MAPL) for managing stream object units (SOBUs), as shown in FIGS. 4 and 5. The stream object general information (SOB_GI) includes the stream start application packet arrival time (S_S_APAT) indicative of the start time of the associated stream object (SOB). As shown in FIG. 2, the incremental packet arrival time (IAPAT), which is a count value counted at constant time intervals (x) between two consecutive stream object units (SOUBs), is included in the mapping list (MAPL) and used as information for searching for the stream object (SOB) and stream object units (SOBUs) afterwards.

The stream start packet arrival time (S_S_APAT) contained in the stream object general information (SOB_GI) is recorded as a 6-byte packet arrival time (PAT) comprising a 9-bit packet arrival time extension (PAT_ext) and 39-bit packet arrival time base (PAT_base), as shown in FIG. 6A. The packet arrival time extension (PAT_ext) is a modulo-300 counter that is incremented at a rate of 27 MHz, whereas the packet arrival time base (PAT_base) is incremented at a rate of 90 kHz. Unlike format of the stream start application packet arrival time (S_S_APAT), the time stamp recorded along with the application packet shown in FIG. 3 is recorded as a 4-byte packet arrival time (PAT), shown in FIG. 6B, that is incremented at a rate of 27 MHz and can represent from 0 s up to 159 s (=2$^{32}$/27 MHz).

The method for searching a digital data stream corresponding to a requested search time using the navigation and time information regarding the stream objects (SOBs), stream object units (SOBUs) will be explained in detail with reference to an example.

With reference to FIG. 2, suppose that the position (s) of a transport stream packet corresponding to a search time (ST) requested by a user is to be searched for. First, the stream start application packet arrival time (S_S_APAT) contained in the stream object general information (SOB_GI) of each stream object (SOB) is compared with the requested search time (ST) and a stream start application packet arrival time (S_S_APAT) that is closest to but does not exceed the request search time (ST) is detected. Referring to the mapping list (MAPL) of the stream object SOB #1 corresponding to the detected stream start application packet arrival time (S_S_APAT), the incremental application packet arrival times (IAPAT 1~4) contained in the mapping list (MAPL) are summed up. The sum value is multiplied by the unit time (x) and added to the detected stream start application packet arrival time (S_S_APAT). The procedure is repeated until the calculated value (S_S_APAT+x×ΣIAPAT) approaches the requested search time (ST) without exceeding it. In FIG. 2, the summation and multiplication is repeated to include IAPAT 4 because the calculated value exceeds the search time (ST) if the calculation continues to IAPAT5. Then the entry in the mapping list (MAPL) corresponding to the calculated time (S_S_APAT+x×ΣIAPAT) is located and the index of the entry is multiplied by the number of sectors constituting a stream object unit (for example, 32 sectors) to locate the desired stream object unit SOBU 5.

From the start position A' of the searched stream object SOBU 5, the 4-byte packet arrival time (PAT), which is the time stamp of the transport stream packet, is detected. Recall that the stream start application packet arrival time (S_S_APAT) and the packet arrival time (PAT) of a transport stream packet have different formats and therefore the two values cannot be compared directly. For this reason, the difference between the detected packet arrival time (PAT) and the packet arrival time of the first transport stream packet of the stream object unit SOBU 5 is compared with the difference between the requested search time (ST) and the calculated value (S_S_APAT+x×ΣIAPAT) for fine search of the transport stream packet corresponding to the requested search time (ST).

The position A searched based upon the time information (S_S_APAT+x×ΣIAPAT) calculated using the incremental application packet arrival times (IAPATs), however, does not coincide with the actual start position A' of the stream object unit SOBU 5, as shown in FIG. 2. The offset between the transport stream packet position A detected by the fine search operation and the actual position A' results in a delay in the search operation.

As a result, additional information indicative of the offset value between A' and A (Offset_SZ in FIG. 2) is necessary for precisely searching for the position (s) of the transport stream packet corresponding to the requested search time (ST). It is not desirable, however, to add the additional information to every stream object unit (SOBU), which dramatically lowers the recording efficiency of the recording medium.

The digital data communication between set top box 100 and streamer 200 is conducted through an IEEE-1394 digital communication interface. The IEEE-1394 interface inserts a time stamp of a frequency of 24.576 MHz into each transport stream packet before transmitting the transport stream packets for guaranteeing real-time digital data communication.

As explained before, streamer 200 also adds time stamps of a frequency of 27 MHz to the transport stream packets of the recorded data for presentation. Since the clock used by streamer 200 differs from that used by the IEEE-1394 interface, the time information of the transport stream transmitted through the IEEE-1394 interface based upon a 24.576 MHz clock may become different from that of streamer 200 based upon a 27 MHz clock, which may cause critical problems such as skipped presentation of video data.

SUMMARY OF THE INVENTION

It is an object of the present invention to provide a method and apparatus for creating and recording time information intended for precisely searching a recording medium for a requested packet stream unit. When recording received packet stream units on a recording medium, time information pertaining to each of the received packet stream unit is created and added to the corresponding packet stream unit. The format of the added time information is compatible with a search time requested by a user so that the timing error that may arise in search operations can be effectively eliminated.

It is another object of the present invention to provide a method and apparatus for creating and recording arrival time information of each packet stream unit so that the arrival time added to each of the received transport stream unit when recording received packet stream units is synchronized with the clock used in digital interfaces.

The method for recording time information for digital data streams in accordance with the invention comprises detecting the packet arrival time of each received transport stream packet and recording the detected packet arrival time in the format compatible with the format of a search time information.

The recording medium on which the time information for digital data streams in accordance with the present invention is recorded comprises a data area wherein packet arrival times and transport stream packets are recorded, being organized as stream objects and navigation data area wherein search time information the format of which is compatible with the packet arrival time is recorded.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings:

FIG. 4 is a table showing the management information of a general recorded data stream;

FIG. 5 is a table showing a part of the management information of a general recorded data stream in detail;

FIG. 6A and 6B are tables showing the time information of a general recorded data stream;

DETAILED DESCRIPTION OF THE PREFERRED EMBODIMENTS

In order that the invention may be fully understood, preferred embodiments thereof will now be described with reference to the accompanying drawings.

Figure 7A:
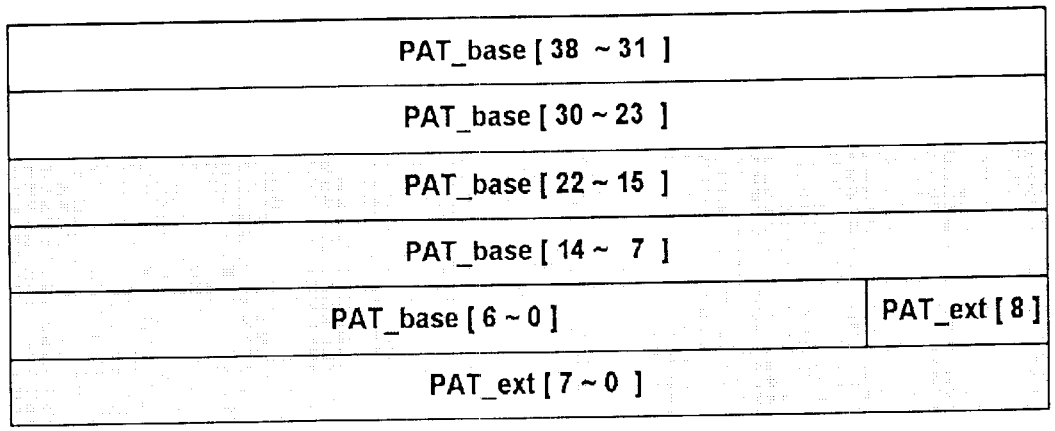
FIG. 7A and 7B are tables showing the time information of a recorded data stream according to an embodiment of the present invention.
Figure 7B:
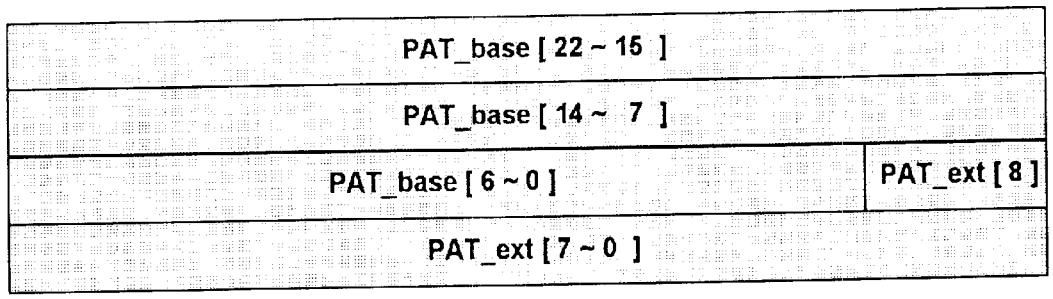

FIG. 7A and 7B depict the data formats of the stream start application packet arrival time (S_S_APAT) and packet arrival time (PAT) in accordance with an embodiment of the invention. Like a clock counting method and format thereof used when creating the digital data stream, the 6-byte stream start application packet arrival time (S_S_APAT) contained in the stream object general information (SOB_GI) comprises a 9-bit packet arrival time extension (PAT_ext) and a 39-bit packet arrival time base (PAT_base). The packet arrival time extension (PAT_ext) is a modulo-300 counter that is incremented at a rate of 27 MHz, whereas the packet arrival time base (PAT_base) is incremented at a rate of 90 kHz. On the other hand, the packet arrival time (PAT) of a transport stream packet is 4-byte data comprising a 9-bit packet arrival time extension (PAT_ext) and 23-bit packet arrival time base (PAT_base). Like the stream start application packet arrival time (S_S_APAT), the packet arrival time extension (PAT_ext) is a modulo-300 counter that is incremented at a rate of 27 MHz and the packet arrival time base (PAT_base) is incremented at a rate of 90 kHz. The created packet arrival time (PAT) is included in each received transport stream packet to form stream object units to be recorded on a recording medium.

In consequence, the 4-byte packet arrival time (PAT) of a transport stream packet has the same format as the lower 4 bytes of the 6-byte stream start application packet arrival time (S_S_APAT) and so the lower 4-byte data of the stream start application packet arrival time (S_S_APAT) always coincides with one of the recorded 4-byte packet arrival times (PATs). Also, there is certainly a packet arrival time (PAT) coinciding with the lower 4-byte data of the search time (ST) requested by a user, the 6-byte search time (ST) comprising a packet arrival time base (PAT_base) and a packet arrival time extension (PAT_ext) specified by the MPEG format.

It is also possible to record the packet arrival time (PAT) of each transport stream packet as 6-byte data like the stream start application packet arrival time (S_S_APAT). When recording the packet arrival time (PAT), it is desirable to use a shorter data length, for example 4 bytes, to improve the recording efficiency of the recording medium. However, a shorter data length of the packet arrival time (PAT) inevitably leads to a reduced range of the number that the packet arrival time (PAT) can represent. It will be shown below that the reduced range is no obstacle to searching for a requested packet.

Figure 9:
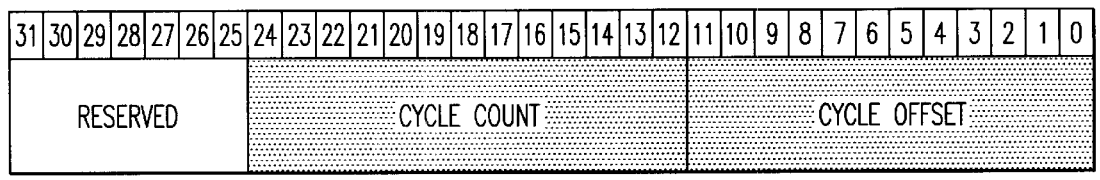
FIG. 9 is the data format of the time information contained in a data stream header transmitted through the IEEE-1394 interface.

The 4-byte packet arrival time (PAT) of a transport stream packet can represent up to 93.2 s (93.2=223/90 kHz) since its packet arrival time base (PAT_base) is 23bit data that is incremented at a rate of 90 kHz. The packet arrival time (PAT) is reset to zero when the value reaches the limit, as shown in FIG. 9.

Figure 8:
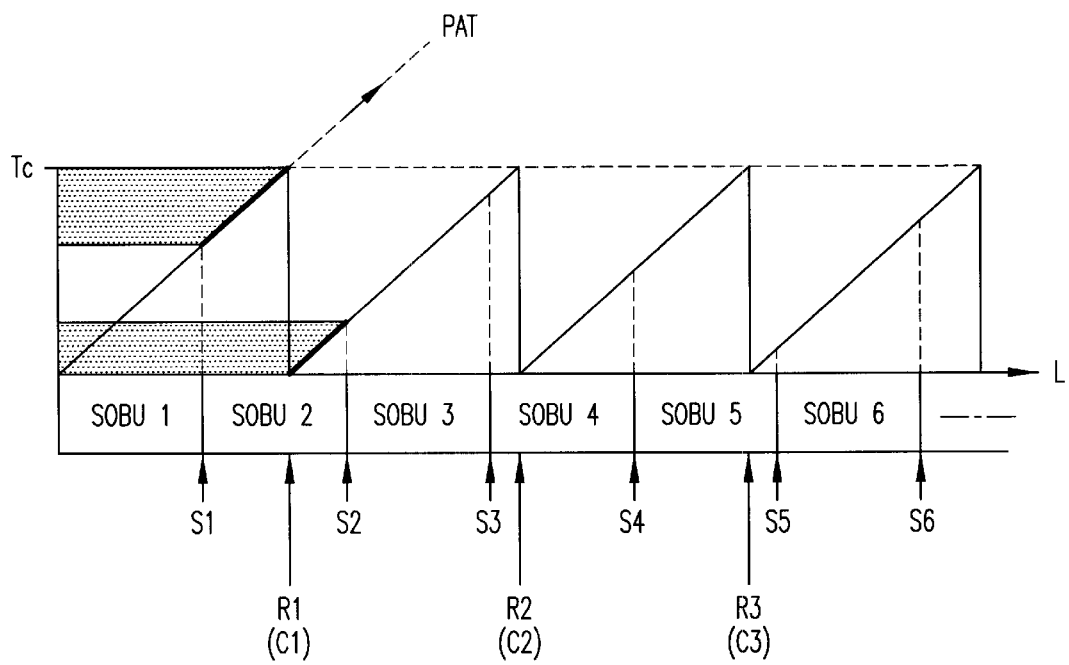
FIG. 8 is a pictorial representation showing the relation between stream object units (SOBUs) and time information according to an embodiment of the present invention.

FIG. 8 shows the way the packet arrival time (PAT) of each transport stream packet created when a digital data stream received by set top box is recorded in streamer 200. It is assumed that a stream object unit (SOBU) is made up of 32 sectors with each sector being 2048 bytes and the transfer rate of the data stream is 10 kbps. Hence, the time that elapses to record a stream object unit (SOBU) is 52.4 s (52.4=32 sectors×2048 byte/10 Kbps) and the packet arrival time (PAT) is reset at 93.2 s intervals. In other words, a stream object unit is created every 52.4 s and the reset carry (PAT_carry) of the packet arrival time (PAT) is created every 93.2 s (93.2=223/90 kHz). As a result, the packet arrival times (PATs) of all transport stream packets belonging to a stream object unit (SOUB) have mutually exclusive values as long as the transfer rate of the digital data stream exceeds 10 Kbps.

Figure 1:
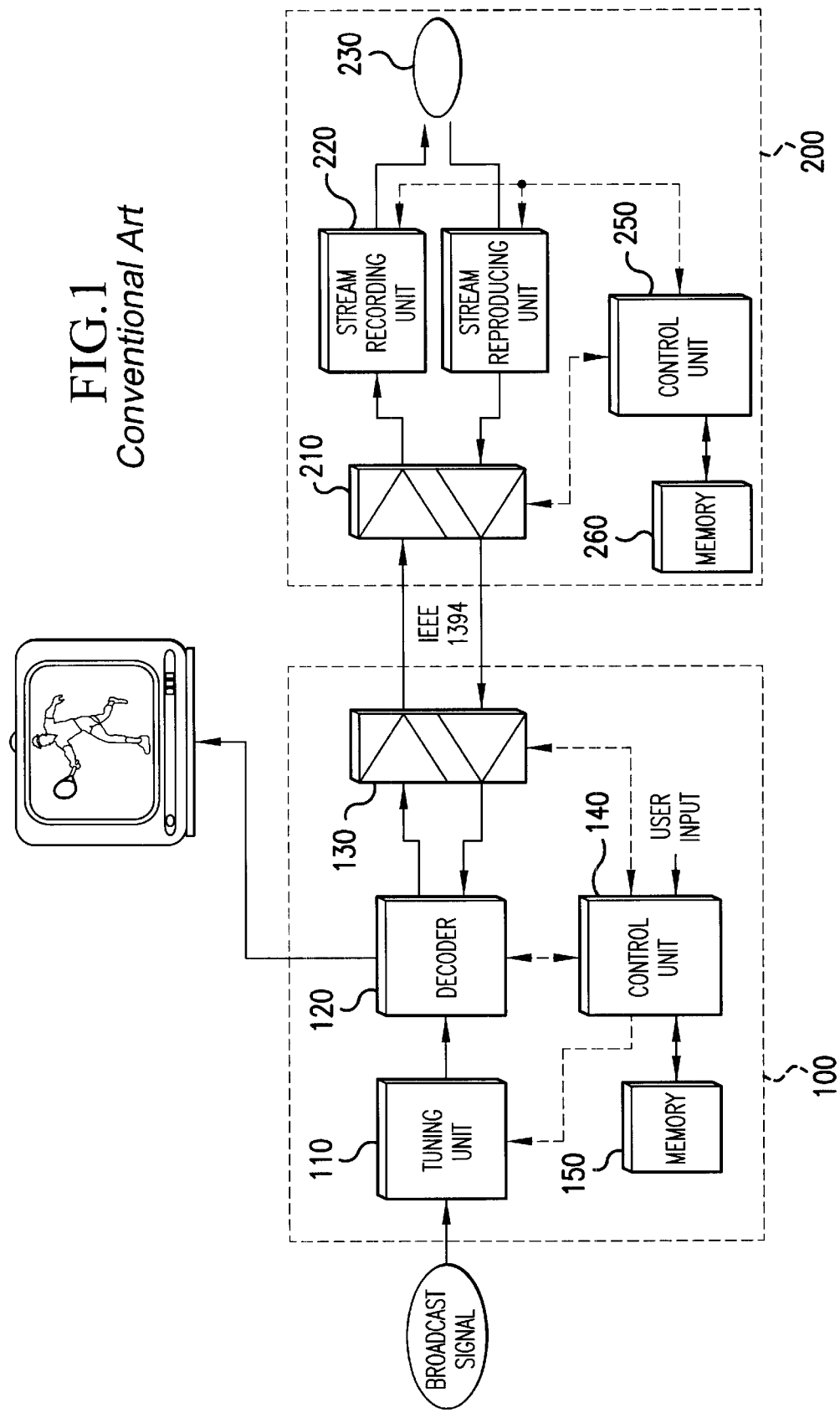
FIG. 1 is a block diagram of an apparatus in which a conventional method for creating and recording the management information of a digital data stream can be employed.
Figure 2:
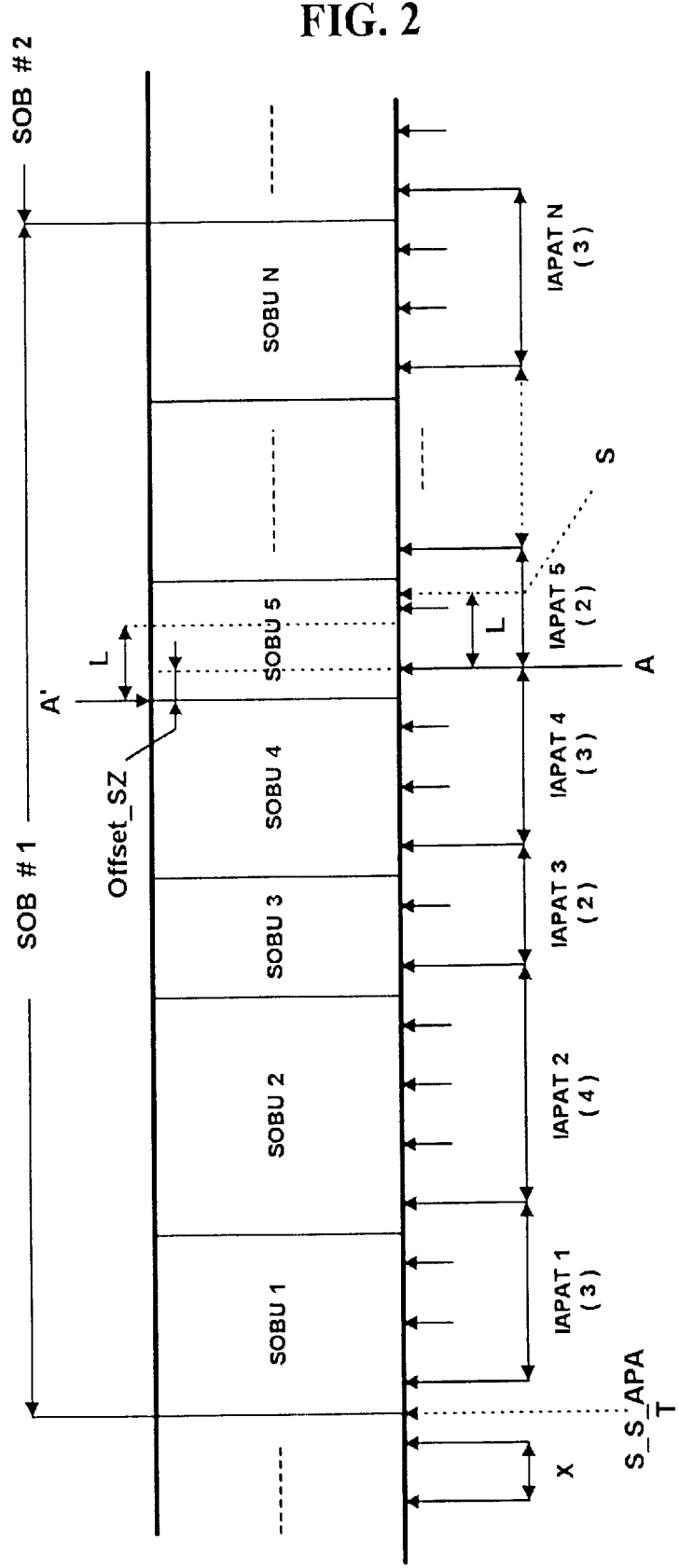
FIG. 2 is a pictorial representation of the process of creating and recording the management information of a digital data stream according to a conventional method.
Figure 3:
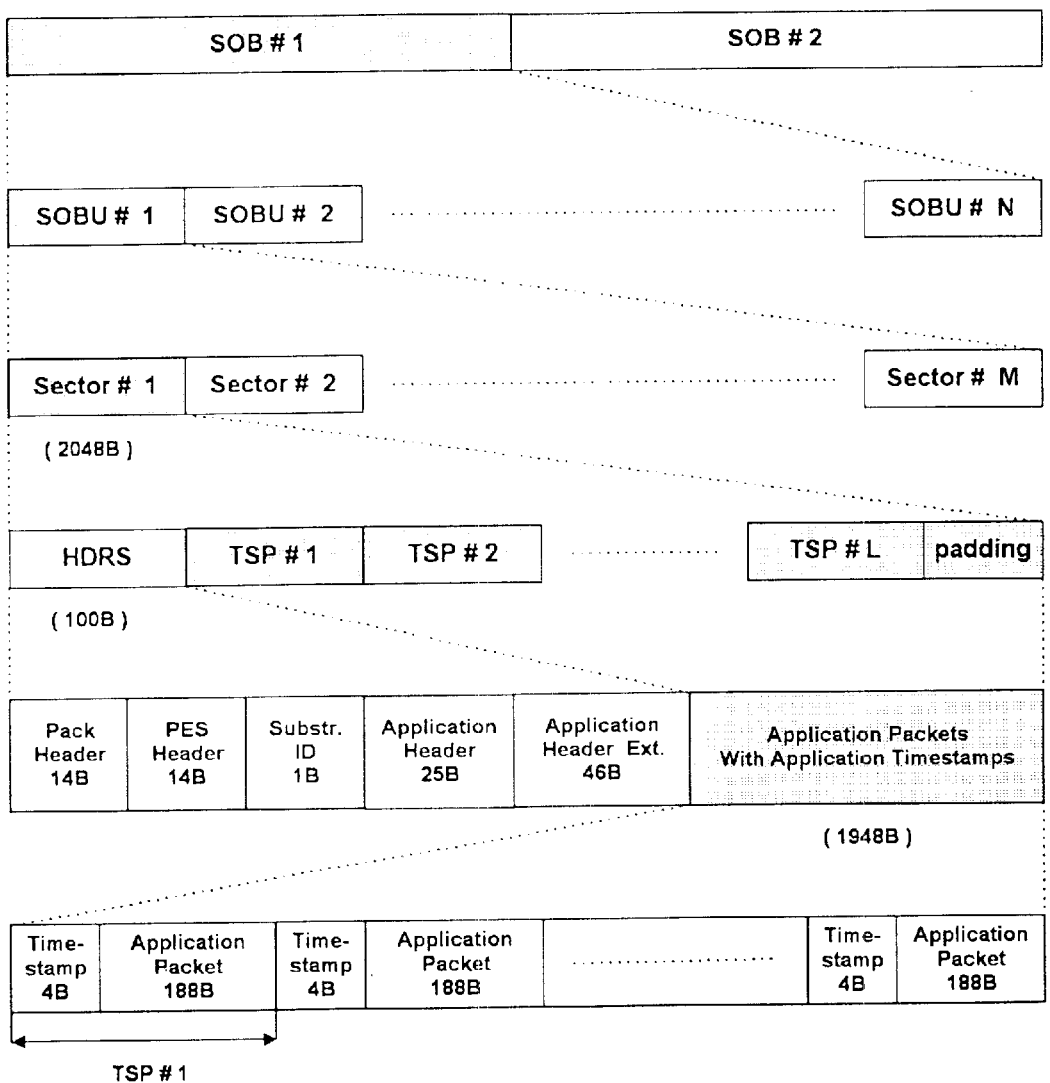
FIG. 3 is a pictorial representation showing the hierarchical structure of a general recorded digital data stream.

The method for searching for the position (s) of a transport stream packet corresponding to a search time (ST) requested by a user from the data stream recorded as shown in FIG. 8 will be explained with reference to FIG. 2. First, the stream start application packet arrival time (S_S_APAT) contained in the stream object general information (SOB_GI) of each stream object (SOB) is compared with the requested search time (ST) and a stream start application packet arrival time (S_S_APAT) that is closest to but does not exceed the request search time (ST) is detected. Referring to the mapping list (MAPL) of the stream object SOB #1 corresponding to the detected stream start application packet arrival time (S_S_APAT), the incremental packet arrival times (IAPAT 1~4) contained in the mapping list (MAPL) are summed tip. The sum value is multiplied by the unit time (x) and added to the stream start application packet arrival time (S_S_APAT). The procedure is repeated until the calculated value (S_S_APAT+x(ΣIAPAT) approaches the requested search time (ST) without exceeding it. In FIG. 2, the summation and multiplication is repeated to include IAPAT 4 because the calculated value (S_S_APAT+x (ΣIAPAT) exceeds the search time (ST) if the calculation continues to IAPAT 5. The stream object corresponding to the calculated value is SOBU 5, which corresponds to the upper 2-byte data of the search time (ST) requested by a user.

From the start position A' of the searched stream object SOBU 5, the 4-byte packet arrival time (PAT) of each transport stream packet is detected. The detected packet arrival times (PATs) are compared with the lower 4-byte data of the search time (ST) requested by a user to find the transport stream packet (TS) the packet arrival time (PAT) of which coincides with the lower 4-byte data of the search time (ST).

Based upon the stream start application packet arrival time (S_S_APAT) and incremental application packet arrival time (IAPAT) in the mapping list (MAPL), the stream object unit SOBU 5 corresponding to the upper 2-byte data of the requested search time is detected first. Then, the packet arrival time (PAT) of each transport stream packet constituting the stream object unit SOBU 5 is detected and compared with the lower 4-byte data of the search time (ST) to find a desired transport stream packet. By the 2-step procedure, the transport stream packet located in the recording position (S) corresponding exactly to the search time (ST) can be detected.

So far, the method for creating and recording the packet arrival time (PAT) of each transport stream packet on a recording medium has been explained with reference to an embodiment. In the embodiment, the format of the created packet arrival time is compatible with that of the search time information recorded on the recording medium or requested by a user. In another embodiment of the invention to be explained from now, the packet arrival time (PAT) is created in such a way that the packet arrival time (PAT) is counted by count means comprising a bigger-unit time field and a smaller-unit time field so that the format of the packet arrival time (PAT) is compatible with the clock format used in digital interfaces.

FIG. 9 is a pictorial representation of the syntax of a time stamp used to transfer real-time data through the IEEE-1394 communication interface. The time stamp comprises a 12-bit cycle offset field, a 13-bit cycle count field, and a 7-bit reserved field. The cycle offset field is incremented at a rate of 24.576 MHz and can represent up to 125 μs by using 0~BFF(h), whereas the cycle count field is incremented once every 125 μs and can represent up to 1 s by using 0~1F3F(h). When the cycle offset field is reset to zero after counting up to BFF(h), a carry is generated and the cycle count is incremented by 1.

Figure 10:
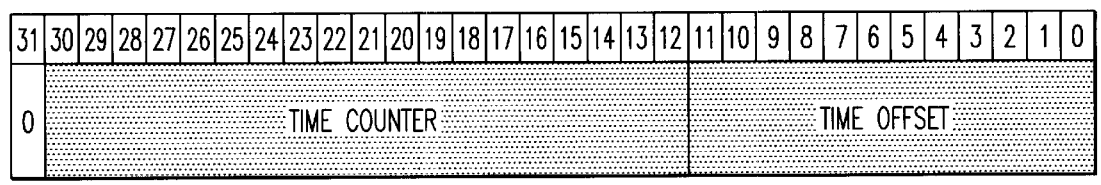
FIG. 10 is the data format of the packet arrival time of a digital data stream according to another embodiment of the present invention.
Figure 11:
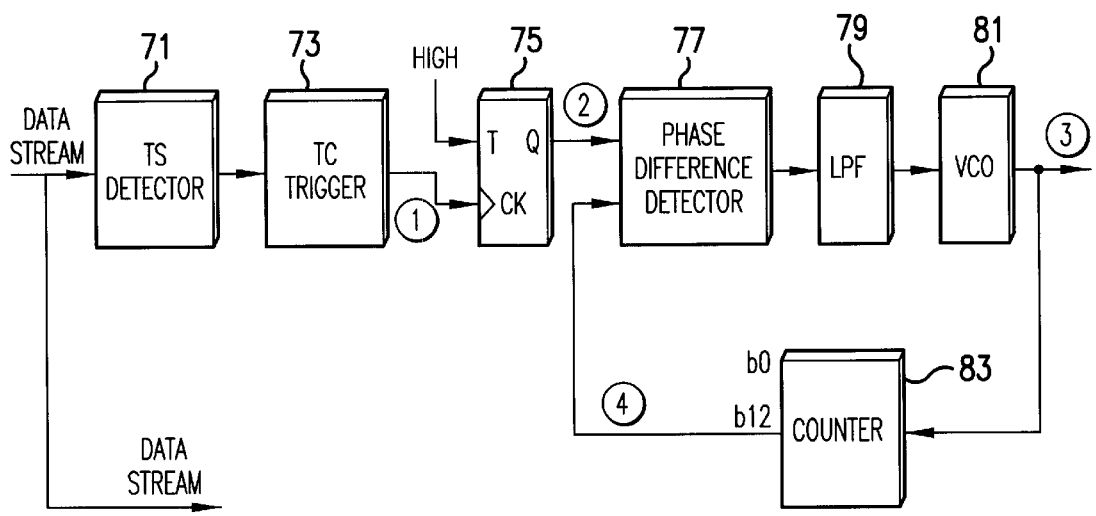
FIG. 11 is a block diagram of an apparatus for synchronizing two different clock using the time information of a digital data stream according to another embodiment of the present invention.

FIG. 10 shows the data format of the packet arrival time (PAT) in accordance with the present invention. The format is intended for synchronizing the packet arrival time (PAT) with the system clock of the IEEE-1394 communication interface whose counting format is shown in FIG. 9 and comprises a 12-bit time offset field, a 19-bit time counter field, and 1-bit flag.

The time offset is incremented at a rate of 27 MHz, which is the streamer clock. Like the cycle offset in the IEEE-1394 interface, it can represent up to 125 μs by using 0~D2E(h). The time counter field is incremented at 125 μs intervals and can represent up to 65 s. Each time the time offset field is reset after counting up to D2E(h), a carry is generated and the time counter field is incremented by 1.

The 1-bit flag indicates whether or not a program clock reference (PCR) is contained in the corresponding transport stream packet. The value "1" indicates that the transport stream packet contains a program clock reference. On the contrary, the value "0" indicates that the corresponding transport stream packet only contains the time counter and time offset of the packet arrival time created based upon the streamer clock.

A counter 83 cyclically counts the output pulse of voltage-controlled oscillator (VCO) 81 from 0 to 3374 using lower 12 bits (b11~b0).

When digital data is outputted from a digital receiving processing unit 210 in streamer 200, a time stamp detector 71 detects the time stamp of the IEEE-1394 interface contained in each transport stream packet and transfers the detected time stamp to a time counter trigger unit 73. Time counter trigger unit 73 generates a pulse such as $\hat{1}$ shown in FIG. 12 each time the state of the least significant bit (b12) of the time counter field of FIG. 10 changes from "1" to "0" or from "0" to "1".

Figure 12:
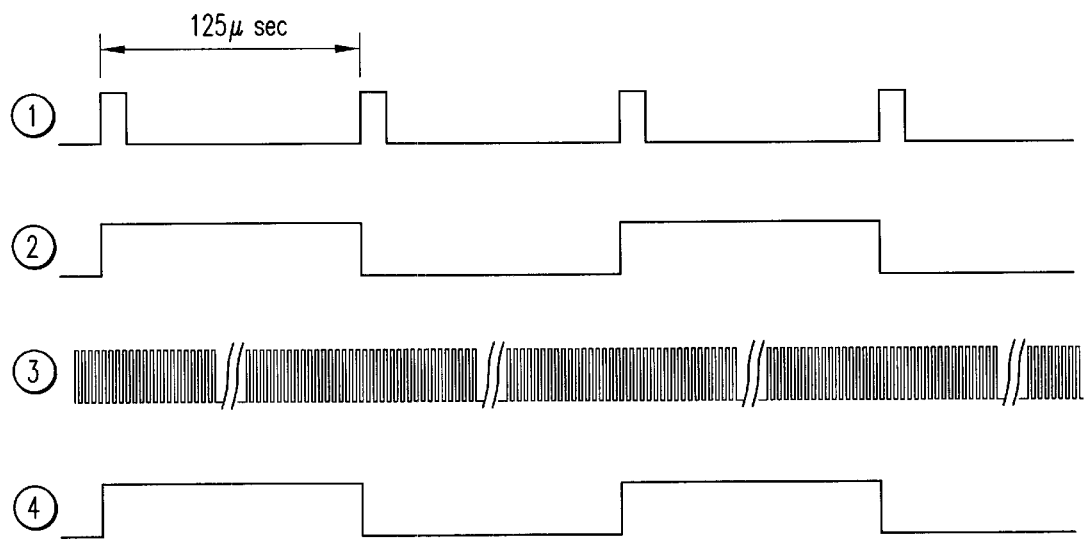
FIG. 12 is a timing diagram of some important nodes of the apparatus shown in FIG. 11.

The output pulse of time counter trigger unit 73 is connected to the clock of a T flip-flop 75. T flip-flop 75 toggles the output Q on the positive edge of the clock pulse. The output Q of T flip-flop 75, which is a 4 kHz pulse figured as $\hat{2}$ in FIG. 12, is connected to an input of a phase difference detector 77. The 13th bit (b12) of counter 83 is also a 4 kHz pulse and is connected to another input of phase difference detector 77. Phase difference detector 77 compares the phases of the two input pulses and outputs an error signal corresponding to the phase difference. The high-frequency components of the error signal is filtered by a low-pass filter 79 and the low-pass filtered error signal is applied to a voltage-controlled oscillator 81. In response to the filtered error signal, voltage-controlled oscillator 81 adjusts its 27 MHz oscillation frequency.

In consequence, the packet arrival time of each transport packet transmitted based upon the time stamps of the IEEE-1394 interface added to the header of the transport stream packet is created and recorded based upon a clock of 27 MHz synchronized with the time stamp clock of 24.576 MHz, thereby preventing the time intervals between two consecutive transport packets from being distorted by transmission.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for recording time information of digital transport streams received through a digital communication interface, comprising the steps of:

(a) counting an arrival time of each unit of the received digital transport stream using an internal clock in the same way that a clock is counted while the transport stream were created, each transport stream unit having a predetermined length;

(b) creating transport time references, each reference comprising two time fields of different time bases, a smaller-unit time field being reset when the counted value reaches a predetermined value and a bigger unit time field being incremented by 1 when said smaller-unit time field is reset; and (c) creating transport stream units by adding the created transport time reference to each unit of the received transport stream.

2. A method set forth in claim 1, wherein the predetermined value is smaller than the maximum value that said smaller-unit time field can represent.

3. The method set forth in claim 1, wherein the predetermined value amounts to the time period during which said bigger-unit time field specified by the digital communication interface is incremented by 1.

4. A method set forth in claim 1, wherein a maximum time length that said bigger-unit time field can represent is less than a maximum time length of a navigation time information needed for accessing the transport stream units.

5. A method set forth in claim 1, wherein said step (c) adds only a part of the created transport time reference to each unit of the received transport stream, said part including said smaller-unit time field.

6. A method set forth in claim 5, wherein said part of the created transport time reference added in said step (c) is the lower 4 bytes of the created transport time reference.

7. A method for recording time information of digital transport streams received through a digital communication interface, comprising the steps of:

counting an arrival time of each unit of the received digital transport stream using an internal clock in the same way that a clock is counted while the transport streams were created, each transport stream unit having a predetermined length;

creating a transport time references, each reference comprising two time fields of different time bases, a smaller-unit time field being reset when the counted value reaches a predetermined value and a bigger-unit time field being incremented by 1 when said smaller-unit time field is reset;

creating transport stream units by adding the created transport time reference to each unit of the received transport stream; and recording a predetermined number of the created transport stream units on a recording medium as a stream object unit.

8. An apparatus for recording time information of digital transport streams received through a digital communication interface, comprising:

a means for generating a clock the frequency of which is the same as the frequency of a clock used while the transport streams were created;

a means for counting the generated clock such that a smaller-unit time field is reset when the counted value reaches a predetermined value and a bigger-unit time field is incremented by 1 when the smaller-unit time field is reset; and a means for creating transport stream units by adding the count values of said bigger-unit time field and said smaller-unit time field at the time each unit of the digital transport stream is received to the corresponding unit of the received transport stream, said each unit having a predetermined length.

9. An apparatus set forth in claim 8, further comprising means for recording a predetermined number of the transport stream units on a recording medium as a stream object unit.

10. An apparatus set forth in claim 8, wherein the predetermined value is smaller than the maximum value that said smaller-unit time field can represent.

11. An apparatus set forth in claim 8, wherein the predetermined value amounts to the time period during which said bigger-unit time field specified by the digital communication interface is incremented by 1.

12. An apparatus set forth in claim 8, wherein a maximum time length that said bigger-unit time field can represent is less than a maximum time length of a navigation time information needed for accessing the transport stream units.

13. An apparatus for recording time information of digital transport streams received through a digital communication interface, comprising:

a counting means for counting an internal clock such that a smaller-unit time field is reset when the counted value reaches a predetermined value and a bigger-unit time field is incremented by 1 when said smaller-unit time field is reset; and a means for constructing transport stream units by removing the time information added to the received transport stream by the digital communication interface and adding the count value of said counting means to each unit of the transport stream when said each unit of the digital data stream is received, said each unit having a predetermined length.

14. An apparatus set forth in claim 13, further comprising means for recording a predetermined number of the transport stream units on a recording medium as a stream object unit.

15. An apparatus for recording time information of digital transport streams received through a digital communication interface, comprising:

a clock generator to generate a clock the frequency of which is the same as the frequency of a clock used while the transport streams were created;

a counter to count the clock generated by said clock generator such that a smaller-unit time field is reset when the counted value reaches a predetermined value and a bigger-unit time field is incremented by 1 when the smaller-unit time field is reset; and a data formatter to create transport stream units by adding the count values of the bigger-unit time field and smaller-unit time field of said counter at the time each unit of the digital transport stream is received to the corresponding unit of the received transport stream, said each unit having a predetermined length.

16. An apparatus for recording time information of digital transport streams received through a digital communication interface, comprising:

a counter to count an internal clock such that a smaller-unit time field is reset when the counted value reaches a predetermined value and a bigger-unit time field is incremented by 1 when said smaller-unit time field is reset; and a data format constructor to construct transport stream units by removing the time information added to the received transport stream by the digital communication interface and adding the values in said bigger-unit time field and said smaller-unit time field of said counter to each unit of the transport stream when said each unit of the digital data stream is received, said each unit having a predetermined length.

* * * * *